Oct. 24, 1967 W. H. DAVENPORT 3,348,942
RECOVERY OF RHENIUM VALUES
Filed March 8, 1965
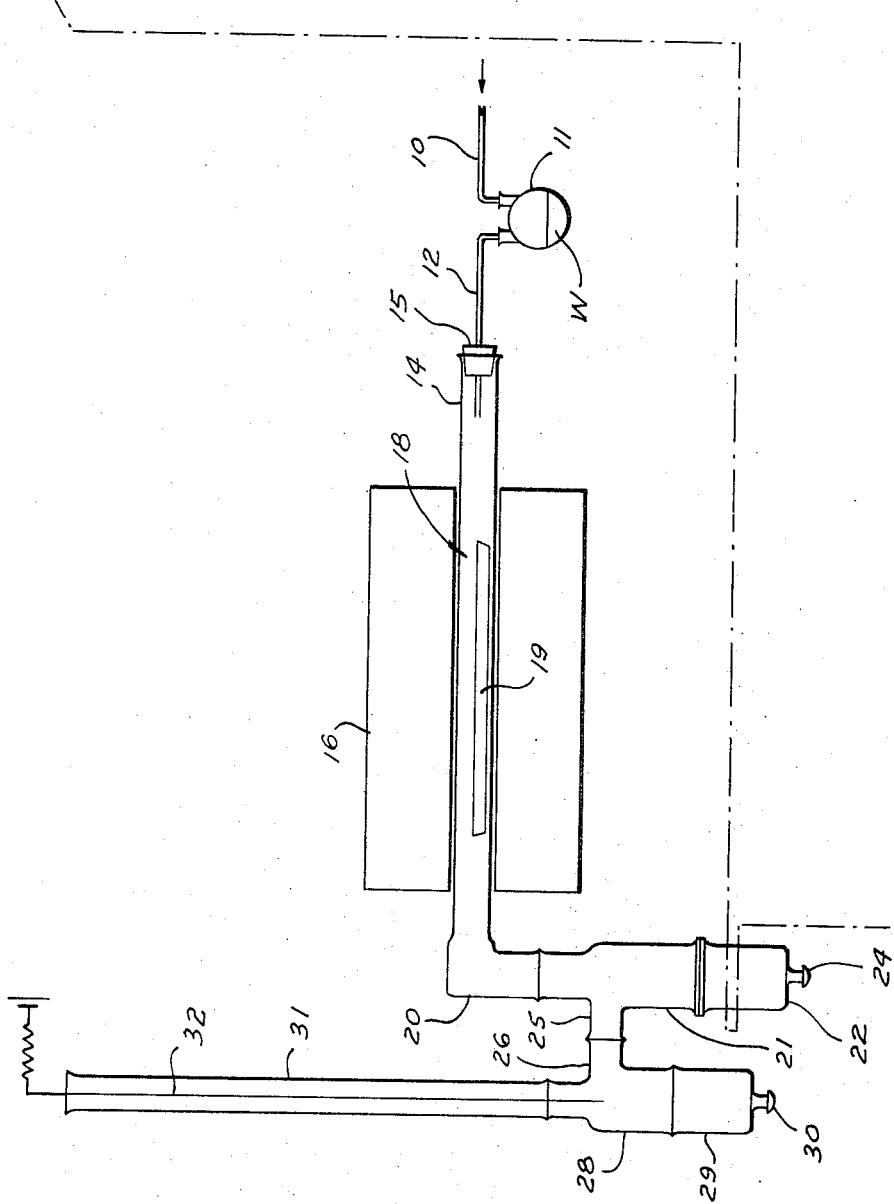
INVENTOR
WILLIAM H. DAVENPORT
BY
Frank E. Robbins
ATTORNEY

United States Patent Office 3,348,942
Patented Oct. 24, 1967

3,348,942
RECOVERY OF RHENIUM VALUES
William H. Davenport, Woodbury, Conn., assignor to Chase Brass and Copper Co. Inc., Cleveland, Ohio, a corporation of Ohio
Filed Mar. 8, 1965, Ser. No. 437,774
15 Claims. (Cl. 75—62)

This invention relates to a process for recovering rhenium values from a variety of rhenium-containing materials.

Rhenium metal is widely used today in a number of different industrial applications. For example, it is common to form the igniter filament for photoflash bulbs from an alloy consisting of 97% tungsten and 3% rhenium. Rhenium alloys are also often employed for filament material in electron tubes. In addition, rhenium alloys find application in a wide variety of high-temperature applications.

However, rhenium has an extremely high value per unit of weight, and, while it is an economically valuable metal, it is not widely distributed and easily recovered from the earth's crust.

One object of the present invention is to provide a practical process for recovering rhenium values from a variety of rhenium-containing materials.

A more specific object of the invention is to provide a practical process for recovering rhenium, in highly purified form, from metallic material such as scrap, that includes rhenium values.

A related object of the invention is to provide a practical process for the recovery of rhenium in highly purified form from crude compounds that contain rhenium values, such as, for example, the presently commercially available crude concentrates of ammonium perrhenate.

Other objects of the invention will be apparent hereafter from the specification and from the recital of the appended claims.

I have found that rhenium can be recovered effectively from any source in which it can be substantially completely converted to a volatile rhenium oxide. The process of my invention involves continuous direct oxidation, at elevated temperatures, in a moisturized stream of oxygen, with recovery of the rhenium values from a solution of the rhenium oxides thus produced.

At suitable oxidizing temperatures, substantially complete oxidation of the rhenium in the starting material takes place. Volatile rhenium oxide, ordinarily consisting primarily of rhenium heptoxide, sublimes, leaving behind a residue of other materials. By conducting the oxidation in a reaction zone through which there is continuously passed a gaseous stream furnishing oxygen and water vapor, the evolved rhenium oxide is continuously swept away from the reaction zone as it is evolved. The water vapor can be condensed as it leaves the reaction zone, simultaneously to wet and to dissolve the rhenium oxide, thus facilitating collection and recovery of the rhenium oxide in the form of a solution containing rhenium values.

The details of the invention will be better understood by reference to the accompanying drawing and the detailed description thereof, and of exemplary demonstrations of the invention, that follow hereinafter in this specification.

The single figure of drawing is a schematic diagram illustrating apparatus that can be employed for practicing the process of the present invention in accordance with one preferred embodiment thereof.

Referring now in detail to the drawing, the numeral 10 denotes a glass tubing line at the input end of a train of apparatus. This line 10 is connected to a source (not shown) that furnishes oxygen in either substantially pure or diluted form under sufficient pressure to provide a continuous sweep through the entire apparatus, as will be described presently. The source of oxygen may be, for example, a commercial bottle of oxygen with suitable valving for delivery to the system. The inlet line 10 is connected to one port of a flask 11 that contains distilled water W. The outlet port of the flask 11 is connected through a line 12 to the inlet end of a generally cylindrical furnace tube 14. The inlet end of the tube 14 is closed off with a rubber stopper 15, through which the line 12 is passed in substantially gas-tight relation.

A furnace structure 16 is disposed about a central section of the furnace tube 14 to provide a reaction zone that is generally indicated by the numeral 18, and in which a boat 19 is disposed.

The furnace tube 14 is formed at its outlet end with a downwardly directed ell 20, that communicates with the body of an air-cooled condenser 21. A generally cup-shaped receiver 22 is mounted at the lower end of the condenser 21 and is provided with an outlet 24 that can be suitably valved, to facilitate withdrawal of material from the receiver.

The condenser 21 is connected through a neck 25 to a corresponding neck 26 of a second air-cooled condenser 28. A second receiver 29 is disposed at the lower end of the second condenser 28, and this receiver is also provided with an outlet 30 that can be suitably valved to facilitate withdrawal of its contents. An upright, generally tubular column 31 is mounted at the upper end of the second condenser 28, and an electrostatic precipitator 32 is disposed in this column, for a purpose to be described presently. The column 31 is open to the atmosphere at its upper end. The diameter of the column 31 is relatively large, in comparison to the diameter of the inlet line 10 of the equipment train.

The operation of the equipment will now be described by reference to specific examples demonstrating the practice of the process of the present invention according to preferred embodiments thereof.

EXAMPLE 1

*Recovery of rhenium from alloy scrap*

An apparatus generally similar to that illustrated in the drawing was employed to recover rhenium values from metallic scrap composed of an alloy containing 75% by weight of tungsten and 25% by weight of rhenium. The scrap was in a variety of shapes, of irregular and varied sizes.

The scrap was placed in a boat, and the boat was stoked into a tube furnace. The furnace was operated at a temperature of about 927° C. Oxygen from a bottle of commercial oxygen was passed over a body of distilled water in a flask that was maintained at 99° C.

The moisturized oxygen stream was passed into the furnace tube after the scrap had been brought up to the ambient furnace temperature. Under these conditions, the rhenium in the scrap was selectively oxidized, and rhenium oxide evolved within the furnace tube as a dense white cloud. The gaseous stream swept this cloud along the tube as it evolved, so that there was no opportunity for condensation or agglomeration within the furnace tube itself, or immediately adjacent its discharge end.

In the condenser at the discharge end of the furnace, the moisture in the gas stream was condensed, and the condensed moisture simultaneously wetted and dissolved the rhenium heptoxide and any other rhenium oxides in the gas stream. The condensed solution collected in the receiver at the lower end of the condenser.

The gas stream passed from the first condenser into the second condenser, carrying with it some of the rhenium oxide and moisture not carried down in the first condenser. The gas stream discharged to the atmosphere through the upright tube above the second condenser, and any remaining amount of water vapor and rhenium oxide was removed from the gas stream as it discharged, by the combined action of condensation and the electrostatic precipitator. The condensed material collected as a solution in the receiver at the lower end of the second condenser.

It is preferred that each of the receivers contain, at the commencement of operations, a small amount of a solution of hydrogen peroxide, as to maintain an oxidizing atmosphere throughout the entire train of equipment.

The product solutions that are obtained from the two receivers were combined and processed, by treatment with ammonium hydroxide, to form an ammonium perrhenate solution was subjected to evaporation and crystallization, and the resulting salt was then separated by filtration, dried, and weighed. The contained rhenium corresponded to a recovery in excess of 96% by weight of the rhenium present in the metallic scrap that was stoked into the furnace.

Other demonstrations of the invention have indicated that it is usually possible to obtain a recovery of rhenium values of at least 98% by weight or better. Usually, the percentage recovery depends upon the quality of the source material.

EXAMPLE 2

*Recovery of rhenium values from commercial ammonium perrhenate*

Commercially available ammonium perrhenate contains about 5% by weight of a variety of impurities, that primarily consist of sulfates of ammonia, iron, copper, molybdenum, and other metals.

A charge of crude commercial ammonium perrhenate was stoked into a furnace in an equipment train such as is illustrated in the drawing. The furnace was operated at a temperature in the range from about 450° C. to about 500° C., while a moisturized oxygen stream was passed through the furnace.

Rhenium oxide was evolved and condensed as in the previous example, and the rhenium values were recovered with an efficiency in excess of 98% in terms of weight of rhenium.

GENERAL

The foregoing examples demonstrate the versatility of the process of the present invention and its effectiveness. It should be understood, however, that as is customary, the preferred embodiments of the invention that are described in this application, in the drawing, and in the examples, are for purposes of illustration only. Thus, while it has been found advantageous to employ a combination of simple condensation and electrostatic precipitation to recover the evolved rhenium oxide, simple condensation can be equally as effective as this combination, although somewhat more bulky equipment is required to insure complete condensation.

Moreover, while the apparatus illustrated is simple in form, and is adapted for the practice of the invention as a batch process, the process can be practiced as a continuous process by appropriate modifications of the illustrated apparatus. For example, to modify the apparatus for continuous operation, a feed hopper is mounted at the inlet end of the furnace; a screw conveyor is provided to carry the rhenium-containing material through the furnace; and a seal is mounted at the discharge end of the furnace for permitting removal of the solid residue material without substantial disturbance to the furnace atmosphere.

The process is generally applicable to any rhenium-containing material whose rhenium content can be substantially completely converted to a volatile rhenium oxide. If the material is a metallic scrap, the scrap may be composed of any alloy that forms non-protective oxides. For example, some of the important commercial rhenium alloys contain either tungsten or molybdenum or both, and excellent recoveries can be obtained from such alloys. In addition, alloys that contain tantalum, cobalt, carbon, silicon, and vanadium, or mixtures thereof, provide excellent starting materials for the present process. Certain other metallic components, such as, for example, titanium, aluminum or zirconium, have a well-known tendency to form protective oxides that either limit the oxidation rate or inhibit oxidation, and therefore do not make good materials for the practice of the present invention.

In processing metallic scrap, the temperature in the furnace is regulated so as to cause the evolution of rhenium oxide at a practical rate commensurate with the capacity of the equipment, but so as to leave other metallic components as solid residues, usually oxide residues, in the furnace. Thus, to recover the rhenium values from metallic scrap composed of a tungsten-rhenium alloy, the furnace temperature ordinarily should be kept below about 1000° C., to avoid contamination of the recovered rhenium with tungsten values.

In some cases, however, it may be desired to recover metal values in addition to rhenium, from a starting material. In such cases, the liquid that is withdrawn from the receivers will contain metal values in addition to rhenium values. Separation and recovery of the rhenium can then take place in accordance with known techniques by forming ammonium perrhenate, and distilling it off at a low temperature, for example, in the range from about 400° C. to about 500° C., to recover rhenium values free from other metal values.

In practicing the present invention, the use of moisture in a flowing gas stream is an essential and also a unique feature of the invention. Sublimed rhenium heptoxide tends to collect as a solid on cool surfaces. In the absence of a flowing gas stream, operation on a continuous basis would be either difficult or impossible, because the solid deposits would quickly plug up the furnace tube. The continuous sweep of gas through the furnace prevents the evolved rhenium oxide from plugging up the furnace, and in the case of tungsten alloys the presence of moisture in the gas stream enhances the oxidation rate and thus improves the efficiency of the process, and, by wetting and dissolving the rhenium heptoxide, keeps the condensers and receivers free from solid deposits that otherwise would tend to obstruct the equipment.

While the invention has been described herein by reference to the details of preferred embodiments thereof, it is to be understood that such description is intended in an illustrative, rather than in a limiting sense, and it is contemplated that various modifications in the construction and arrangement of the parts will readily occur to those skilled in the art, within the spirit of the invention and the scope of the appended claims.

I claim:
1. A process for recovering rhenium values from a rhenium-containing material from which the rhenium can be substantially completely converted to a volatile rhenium oxide, comprising:
    contacting said material in a reaction zone at an elevated temperature with a gaseous stream furnishing oxygen and water vapor, to form volatile rhenium oxide;
    continuously sweeping said gaseous stream from the reaction zone into a recovery zone, to carry the evolved rhenium oxide into the recovery zone;
    condensing the water vapor in the recovery zone to wet and to dissolve the rhenium oxide; and then
    recovering a solution containing rhenium values from the recovery zone.

2. A process in accordance with claim 1 wherein the rhenium-containing material is metallic scrap.

3. A process in accordance with claim 2 wherein the scrap is composed of a tungsten-rhenium alloy.

4. A process in accordance with claim 1 wherein the rhenium-containing material is a salt comprising ammonium perrhenate.

5. A process in accordance with claim 1 wherein the material in the reaction zone is maintained at an elevated temperature at which oxidation proceeds at a reasonable rate at which the evolved volatile rhenium oxide can be substantially completely recovered through condensation of the water vapor to form a solution containing the rhenium values in the recovery zone.

6. A process for recovering rhenium values from a rhenium-containing material from which the rhenium can be substantially completely converted to a volatile rhenium oxide, comprising:
   contacting said material in a reaction zone at an elevated temperature with a gaseous stream furnishing oxygen and water vapor, to form a volatile rhenium oxide that evolves into the gas stream;
   continuously sweeping the gas stream out of the reaction zone and into a recovery zone, to sweep the evolved rhenium oxide out of the reaction zone in the gas stream, substantially without depositing or agglomerating in the reaction zone;
   condensing the water vapor of the gas stream in the recovery zone, to wet and to dissolve the rhenium oxide, and then
   collecting in the recovery zone a solution containing rhenium values from the original material.

7. A process in accordance with claim 6 wherein the rhenium-containing material is metallic material and the reaction zone is maintained at an elevated temperature at which the rhenium oxide is selectively evolved and other metallic oxides remain in the reaction zone as a residue.

8. A process in accordance with claim 7 wherein the metallic material is in the form of an alloy composed predominantly of rhenium, and wherein the temperature in the reaction zone is maintained in the range from about 600° C. to about 700° C.

9. A process in accordance with claim 6 wherein the rhenium-containing material in the reaction zone is metallic scrap composed of an alloy consisting essentially of a major amount of tungsten and a minor amount of rhenium, and wherein the reaction zone is maintained at an elevated temperature at which the rhenium oxide volatilizes but at which any tungsten oxide that is formed remains in the reaction zone as a solid residue.

10. A process in accordance with claim 9 wherein the temperature of the reaction zone is maintained below about 1000° C.

11. A process for recovering rhenium values from a rhenium-containing material that also contains other metal values, and from which the rhenium can be substantially completely converted to a volatile rhenium oxide by direct oxidation, comprising:
   contacting said material in a reaction zone with a gaseous stream furnishing oxygen and water vapor, at an elevated temperature at which rhenium and other metal values in the material are oxidized and evolve as oxides into the gas stream;
   continuously sweeping said gas stream from the reaction zone into a recovery zone, to carry the evolved rhenium and other metal oxide into the recovery zone;
   condensing the water vapor in the recovery zone to wet and to carry down the oxides;
   recovering a solution containing rhenium values from the recovery zone;
   converting said solution to ammonium perrhenate, and then
   separating and recovering the rhenium values from said solution.

12. A process for recovering rhenium values from a crude concentrate of ammonium perrhenate consisting essentially of a major amount of ammonium perrhenate together with a minor amount of impurities comprising predominantly the sulfates of iron, copper, chromium, nickel, molybdenum, and other metal, comprising:
   contacting said crude concentrate in a reaction zone at an elevated temperature with a gaseous stream furnishing oxygen and water vapor, to form volatile rhenium oxide that evolves into the gas stream;
   continuously sweeping said gas stream from the reaction zone into a recovery zone, to carry the evolved rhenium oxide into the recovery zone;
   condensing the water vapor from the gas stream in the recovery zone, to wet and to dissolve the rhenium oxide, and then
   recovering a perrhenic acid solution from the recovery zone.

13. A process in accordance with claim 12 wherein the reaction zone is maintained at a temperature in the range from about 450° C. to about 500° C.

14. A process in accordance with claim 12 wherein the recovered perrhenic acid solution contains at least about 98% or more of the rhenium present in the original crude concentrate of ammonium perrhenate.

15. A process for recovering rhenium values from a rhenium-containing material from which the rhenium can be substantially completely converted to a volatile rhenium oxide, comprising:
   passing a gaseous stream containing oxygen through a moisturizing zone to provide a moisture-laden, oxygen-containing gaseous stream;
   preheating said gaseous stream to an elevated temperature;
   then passing said gaseous stream over said rhenium-containing material in a reaction zone at an elevated temperature, to cause the evolution of volatile rhenium oxide;
   continuously sweeping said gaseous stream from the reaction zone into a recovery zone, to carry the evolved rhenium oxide into the recovery zone;
   maintaining the recovery zone at a sufficiently low temperature to condense the water vapor, to wet and to dissolve the rhenium oxide, and then
   recovering a solution containing rhenium values from the recovery zone.

References Cited

UNITED STATES PATENTS 2,809,092  10/1957  Zimmerley et al. ____ 23—16 X
3,192,011  6/1965  Cooper et al. _____ 23—51

OTHER REFERENCES

Gonser: Rhenium, Elsevier Publ. Co., New York, pp. 6–12 (1962).

DAVID L. RECK, *Primary Examiner.*

H. W. TARRING, *Assistant Examiner.*

UNITED STATES PATENT OFFICE
CERTIFICATE OF CORRECTION

Patent No. 3,348,942                                            October 24, 1967

William H. Davenport

It is hereby certified that error appears in the above numbered patent requiring correction and that the said Letters Patent should read as corrected below.

Column 2, line 40, for "allow" read -- alloy --; column 3, line 13, after "solution" insert -- . The resulting ammonium perrhenate solution --.

Signed and sealed this 12th day of November 1968.

(SEAL)
Attest:

Edward M. Fletcher, Jr.                                      EDWARD J. BRENNER

Attesting Officer                                                  Commissioner of Patents